United States Patent [19]

Ferrari et al.

[11] 4,326,922
[45] Apr. 27, 1982

[54] COMPOSITE NUCLEAR FUEL ASSEMBLY

[75] Inventors: Harry M. Ferrari, Edgewood; Walter J. Dollard, Churchill, both of Pa.

[73] Assignee: Westinghouse Electric Corp., Pittsburgh, Pa.

[21] Appl. No.: 117,418

[22] Filed: Jan. 31, 1980

Related U.S. Application Data

[63] Continuation of Ser. No. 875,653, Feb. 6, 1978, abandoned.

[51] Int. Cl.³ .............................................. G21C 3/30
[52] U.S. Cl. ..................................... 376/435; 376/917
[58] Field of Search ................. 176/78, 77, 76, 74, 176/73, 75, 40

[56] References Cited

U.S. PATENT DOCUMENTS

| | | | |
|---|---|---|---|
| 3,211,627 | 10/1965 | Thorp | 176/76 |
| 3,238,109 | 3/1966 | Kent | 176/78 |
| 3,356,587 | 12/1967 | Heck | 176/78 |
| 3,368,945 | 2/1968 | Keller | 176/78 |
| 3,378,452 | 4/1968 | Costes | 176/40 |
| 3,574,058 | 4/1971 | Gumuenian | 176/78 |
| 3,912,583 | 10/1975 | Iljunin | 176/40 |
| 4,096,033 | 6/1978 | Barry | 176/78 |

Primary Examiner—Donald P. Walsh
Attorney, Agent, or Firm—Edward L. Levine

[57] ABSTRACT

An open lattice elongated nuclear fuel assembly including small diameter fuel rods disposed in an array spaced a selected distance above an array of larger diameter fuel rods for use in a nuclear reactor having liquid coolant flowing in an upward direction. Plenums are preferably provided in the upper portion of the upper smaller diameter fuel rods and in the lower portion of the lower larger diameter fuel rods. Lattice grid structures provide lateral support for the fuel rods and preferably the lowest grid about the upper rods is directly and rigidly affixed to the highest grid about the lower rods.

7 Claims, 7 Drawing Figures

4,326,922

COMPOSITE NUCLEAR FUEL ASSEMBLY

This is a continuation of application Ser. No. 875,653, filed Feb. 6, 1978, now abandoned.

BACKGROUND OF THE INVENTION

1. Field of the Invention

This invention relates to rodded open lattice nuclear fuel assemblies and more particularly provides a fuel assembly having fuel rods of differing diameter.

2. Description of the Prior Art

Nuclear reactors typically include a core made up of a plurality of nuclear fuel assemblies disposed within a vessel through which a gaseous or liquid coolant flows. The coolant removes energy in the form of heat as it flows about and through the fuel assemblies. Particularly in pressurized reactors circulating a liquid coolant such as water it is undesirable to reach a boiling condition and, accordingly, reactor cores are designed to prevent a condition commonly referred to as "departure from nucleate boiling" (DNB). If a vapor is permitted to exist along the fuel rods the heat transfer from the heat generating rods to the surrounding coolant is substantially impaired and a potenstial exists for damage to the fuel rods through overheating. Accordingly, DNB related safety criteria impose an upper boundary on the maximum coolant temperature and therefore limit total reactor efficiency. These concerns are further complicated by the desired utilization of mixed oxide or plutonium fuels which are more expensive to fabricate and inherently have a high neutronic capture cross section and a strong moderator temperature coefficient as compared to more commonly used uranium fuels. And, since the coolant becomes progressively hotter as it flows upwardly through the core it therefore progressively changes density, providing progressively less moderation at the upper portion of the core as compared to the bottom. This results in less control and design flexibility.

Approaches toward alleviating these limitations, primarily in response to DNB effects, include increasing the water-to-fuel ratio of the core and utilizing full core length fuel rods of smaller cross section which generate less energy per unit length. These approaches, however, are complicated by other factors including excessive fabrication costs and larger cores. Additionally, reactor designs incorporating redundant safety systems which respond to the unlikely event of a rupture of the reactor coolant system causing a loss of coolant, flood the core area with coolant that builds up from the bottom toward the top of the core. Additional flexibility in providing a core design responsive to this condition is advantageous.

It is therefore desirable to provide a nuclear fuel assembly which alleviates the temperature and efficiency limitations, and it further is desirable to provide such an assembly which is compatible with mixed-oxide fuel utilization. It is additionally desirable to provide design flexibility to respond to the varying coolant density throughout the core and unlikely coolant discharge occurrences.

SUMMARY OF THE INVENTION

This invention provides a nuclear fuel assembly which allows higher coolant operating temperatures and enhanced utilization of mixed-oxide fuels. It also provides additional core design flexibility. In one embodiment it provides a vertically oriented assembly of elongated fuel rods of two differing diameters. The upper portion of the assembly includes rods of a smaller diameter than rods of the lower portion of the assembly. Both the smaller upper and the larger lower rods are preferably cylindrical and supported by lattice grid structures which allow axial rod expansion. The grids form cells about each rod for lateral support, and the lowermost grid of the upper rods is preferably directly fixed to the uppermost grid of the lower rods. The grids are also joined through tubular guide thimbles which extend through both the upper and lower rod arrays and through which neutron absorbing control rods can be inserted and withdrawn from the assembly to adjust the neutron flux.

A slight space is provided between the upper and lower fuel rods to allow, among other advantageous functions, axial rod expansion without interference among the upper and lower fuel rods. The assembly is advantageously adaptable to use of mixed-oxide fuel in the bottom rods and uranium fuel in the upper rods. In this configuration the space between the upper and lower rods tends to alleviate the sharp power peak which could otherwise occur at the interface of the plutonium and uranium fuels.

In a typical reactor the coolant flows upwardly through the core and locating the smaller diameter rods in the upper portion of the assembly produces a lower generated energy per unit length of the fuel rod in the area where the coolant is the hottest. This allows a higher coolant dicharge temperature from the core and a more efficient system. The relative cross sectional size of the individual upper and lower fuel rods can also be varied as dictated by the designer to respond to the change in moderation with coolant temperature change. Further, a plenum is typically provided in the upper portion of most fuel rods to allow accumulation of gaseous fission products released during reactor operation. Because of the lower generation rate in the upper fuel rods, this upper plenum can be of reduced size in comparison to previous fuel rods. A plenum is also provided for the more energetic lower rods; however, it is located at the bottom of the lower rods to reduce flux peaking at the center of the core. Additionally, neutron absorbing materials can be positioned at the top of the lower fuel rods and at the bottom of the upper fuel rods to limit moderation in the area between the two rod arrays.

BRIEF DESCRIPTION OF THE DRAWINGS

The advantages, nature and additional features of the invention will become more apparent from the following description, taken in connection with the accompanying drawings in which.

DESCRIPTION OF THE PREFERRED EMBODIMENT

Figure 1:
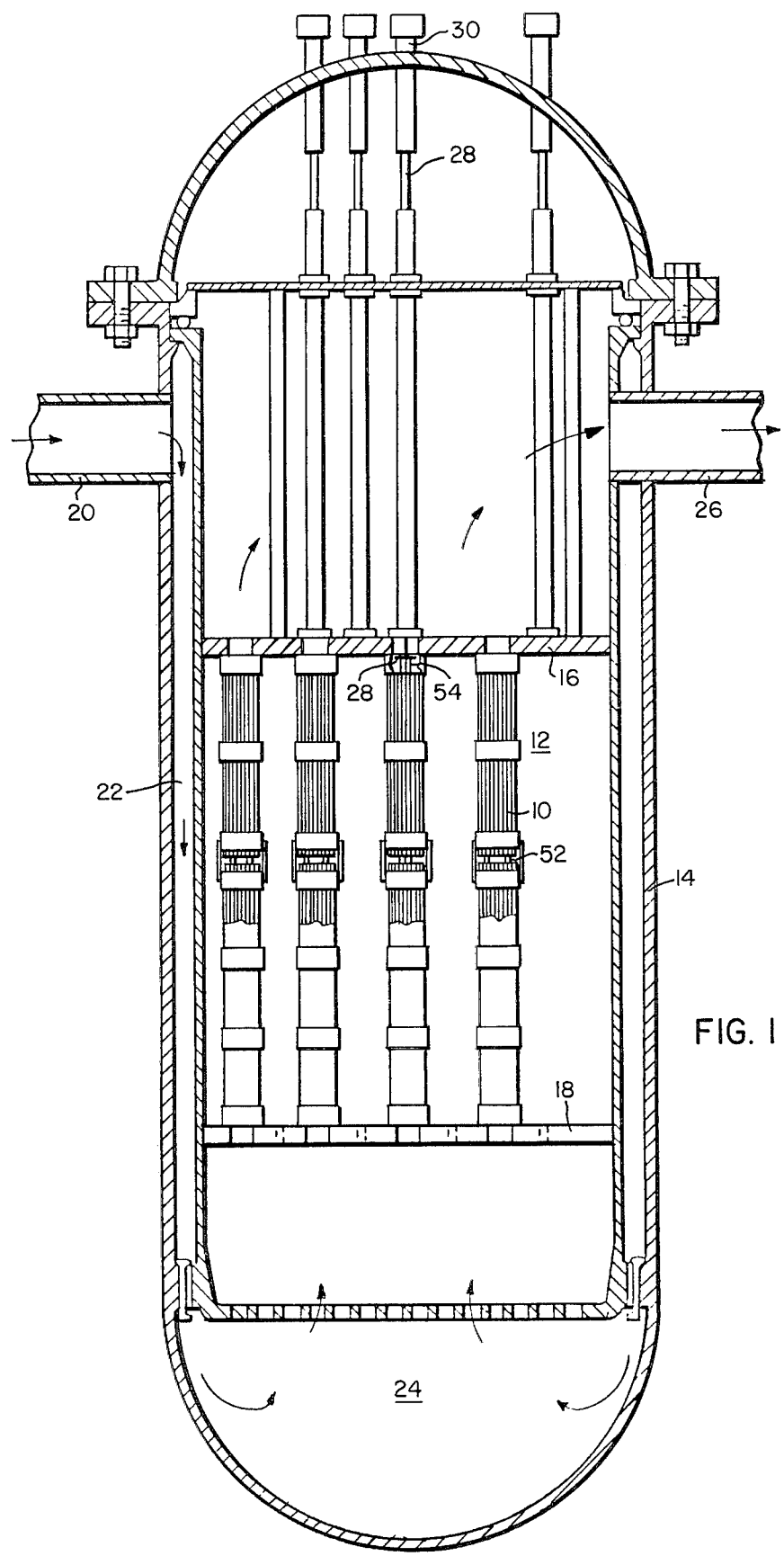
FIG. 1 is an elevation view, in cross section, of a nuclear reactor incorporating the inventive fuel assembly.

Referring now to FIG. 1 there is shown an exemplary pressurized nuclear reactor utilizing composite fuel assemblies 10 in accordance with this invention. The reactor includes a core 12 of the fuel assemblies 10 arranged to approach the configuration of a right circular cylinder. The assemblies 10 are supported within a vessel 14 between an upper core plate 16 and lower core plate 18 both of which are perforated to allow the flow of a coolant fluid therethrough. The reactor coolant fluid, preferably a liquid such as water, enters the vessel 14 through an inlet 20, flows downwardly through an annulus 22, is turned in a plenum 24, and passes upwardly through the core 12. In similar reactor configurations the coolant enters the vessel 14 below the core and passes upwardly. The coolant absorbs energy as it flows upwardly through and about the fuel assemblies 10, is discharged from the vessel 14 through an outlet 26, and discharges energy to apparatus (not shown) typically for the ultimate purpose of electrical power generation.

The power generated in the core 12 can be controlled in various well-known manners including use of a neutron absorber, such as boron, flowing with the coolant together with neutron absorbing control elements 28, top mounted in accordance with this invention, reciprocatingly positionable within or about the fuel assemblies 10 by drive apparatus 30. While a multitude of core and fuel assembly configurations exist, this invention is particularly beneficial in thermal neutron cores having elongated vertically positioned fuel assemblies through which coolant flows in a generally upward direction.

Figure 2:
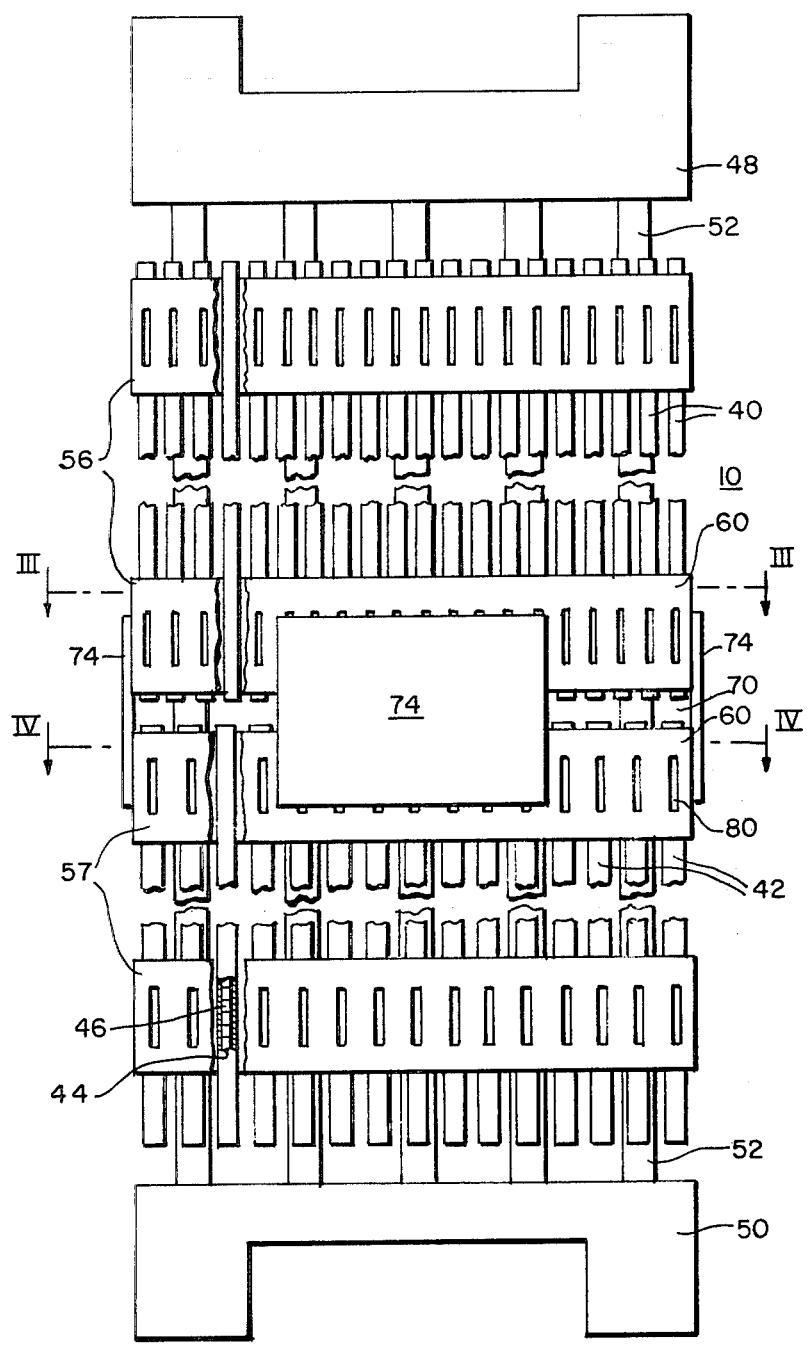
FIG. 2 is an elevational schematic of a composite nuclear fuel assembly in accordance with the invention.

A preferred fuel assembly 10 in accordance with the invention is shown in FIG. 2. It includes a plurality of upper fuel rods 40 and a plurality of lower fuel rods 42 arranged in a regular preferably rectangular array. The rods 40, 42 are peferably cylindrical and the upper rods 40 are of smaller diameter than the lower rods 42. Accordingly, the number of upper fuel rods is greater than the number of lower fuel rods. Each rod 40, 42 includes an hermetically sealed metallic cladding 44 within which is disposed fissonable nuclear fuel preferably in the form of cylindrical pellets 46. The fuel can be of various types well known in the art, such as enriched uranium, and in one embodiment advantageously includes enriched uranium in the upper rods 40 and plutonium fuel in the lower rods 42. Where, for example, both the upper and lower rods include uranium of similar enrichment, although differing enrichments can be utilized, the power generated per unit length of each fuel rod is higher in the lower rods 42 than in the upper rods 40. Thus, coolant flowing in an upward direction through and about the assembly 10 is initially heated in the lower portion of the assembly and further heated to a higher temperature in the upper portion. Departure from nucleate boiling (DNB) concerns are, however, alleviated and a higher coolant core discharge temperature attained as a result of the lower energy output per unit length of upper fuel rod measured, for example, in kilowatts per foot. Table I presents exemplary parameters resulting from utilization of the inventive fuel assembly in a pressurized water reactor core utilizing enriched uranium fuel in upper rods 40, approximately six feet in length, and in lower rods 42 approximately six feet in length. The base for comparison is a core of assemblies having twelve foot long fuel rods in a fifteen by fifteen array, and is compared to composite assemblies 10 having lower rods 40 in a fifteen by fifteen array and upper rods 42 in, respectively, a twenty by twenty array and a thirty by thirty array.

TABLE I

|  | Base 15 × 15 | Composite Lower: 15 × 15 Upper: 20 × 20 | Composite Lower: 15 × 15 Upper: 30 × 30 |
|---|---|---|---|
| No. of Fuel Rods | 204 | 316 | 816 |
| Average Linear Power, kw/ft | 7.06 | 4.6 | 1.76 |
| Peak Linear Power, kw/ft | 18.8 | 12.1 | 4.7 |
| Peak UO$_2$ Center-Line Temperature, °F. | ~4200 | ~3000 | ~1600 |
| Increase in Coolant Outlet Temperature, °F. | — | 20 | 50 |

As seen from Table I the increase in coolant temperature is greater where the number of upper rods is greater. Additionally, the number of fuel rods is less than that of a complete array as a result of the fabrication of the assembly 10 and incorporation of additional components such as guide thimbles discussed below. For example, a complete 15×15 array would have 225 fuel rods; however, only 204 fuel rods are utilized, the balance of locations being occupied by guide thimbles. In addition to the fuel rods 40, 42 the assembly 10 includes (FIG. 2) a top nozzle 48 and a bottom nozzle 50 affixed by guide thimbles 52 to form a skeletal load transmitting unit. The thimbles 52 can be used merely for assembly support of for guiding the control element rods 54 (FIGS. 1 and 6) into and out of the assembly or for locating other core components. Upper 56 and lower 57 lattice grid structures, shaped generally as an "egg crate", are affixed to the thimbles 52 at selected elevations. The grids 56, 57 form a cell 58 about each rod or thimble, shown best in FIGS. 3 through 5. The cells 58 for the fuel rods 40, 42 provide lateral support while allowing axial rod expansion. The grids 56, 57 include, in addition to typical flow mixing vanes 59 and spring acting supports 61, outer straps 60 which form a peripheral boundary about the rod array, and inner straps 62 together forming the individual cells 58. The peripheral dimensions of the upper 56 and lower 57 grids, defined by the outer straps 60, are the same.

Figure 3:
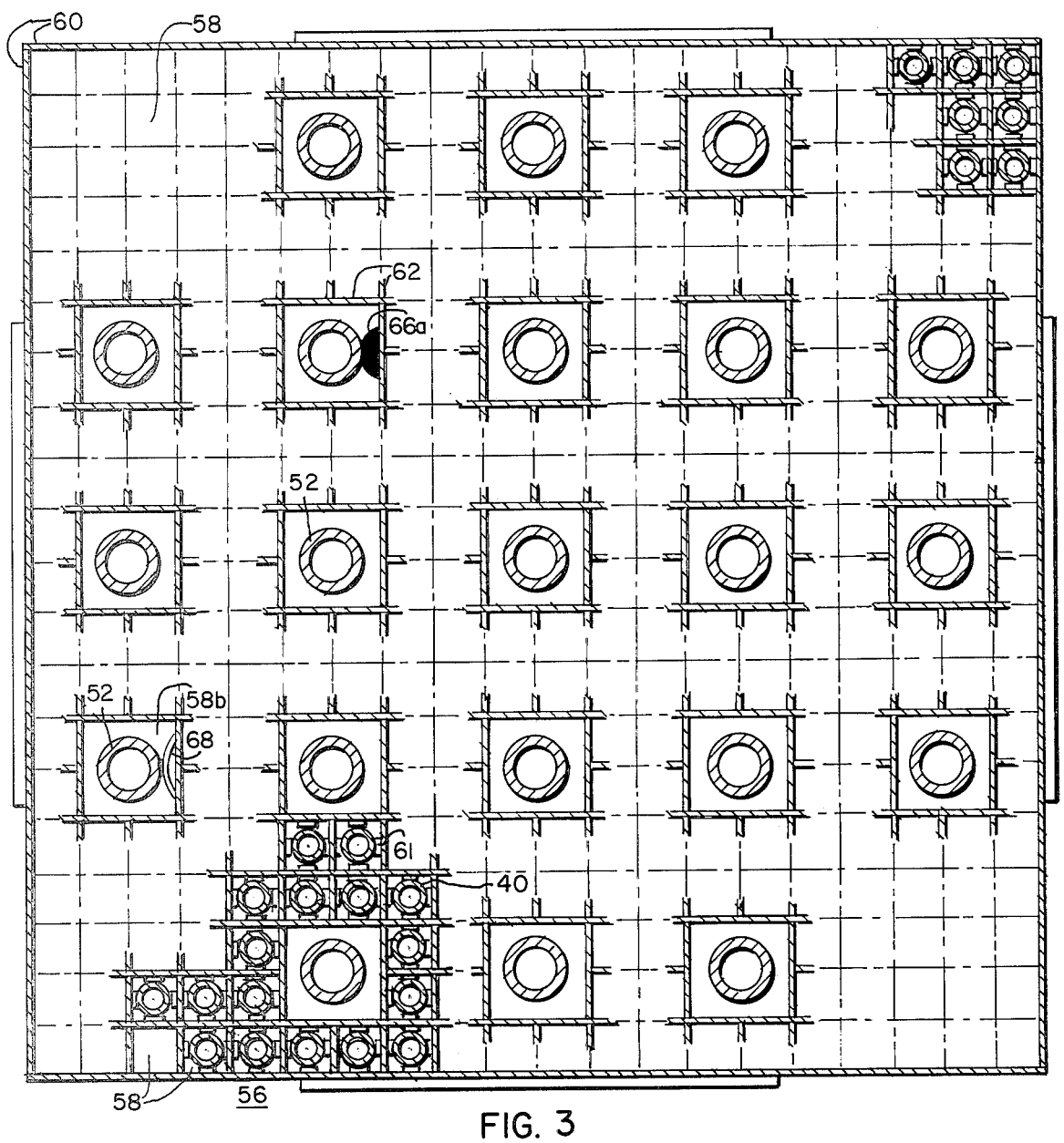
FIG. 3 is a simplified plan view of an upper fuel assembly grid structure in accordance with one embodiment of this invention.

The grids 56, 57 must be arranged not only to provide support for the rods 40, 42 of differing diameter, but also to provide cells 58a, 58b for attachment to the thimbles 52 which are, in the preferred embodiment, of constant, preferably circular cross section. Since the upper and lower grid cells are of different dimensions, provision must be made for attachment of the guide thimbles. Accordingly, the lower fuel rods 42 are preferably of substantially the same cross section as the thimbles 52 so that the cells 58 and 58a of the lower grids 57 are all of the same dimensions. The cells 58 of the upper grids 56, however, include cells 58b which receive guide thimbles 52 and are enlarged in comparison to the cells 58 supporting the upper fuel rods 40. As shown in FIG. 3, in the exemplary composite fuel assembly 10 the cells 58b each represent a combination of four upper grid fuel rod receiving cells. In a modification, the thimbles 52 can also be larger than the lower fuel rods 42, so that cells are also provided in the lower grids 57 which are larger than the cells receiving the fuel rods 42.

Figure 4:
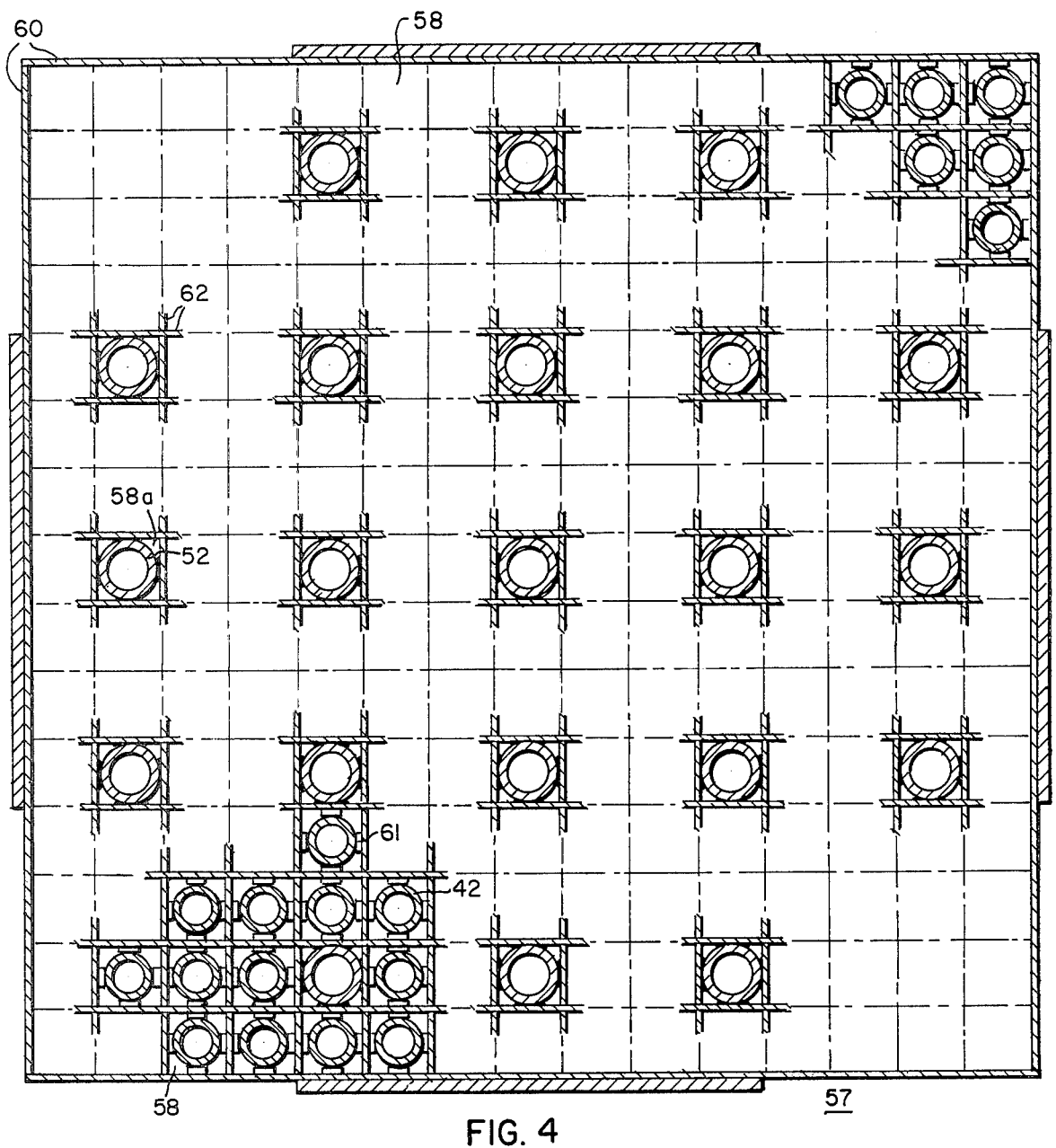
FIG. 4 is a simplified plan view of a lower fuel assembly grid structure compatible with the embodiment of FIG. 3.
Figure 5:
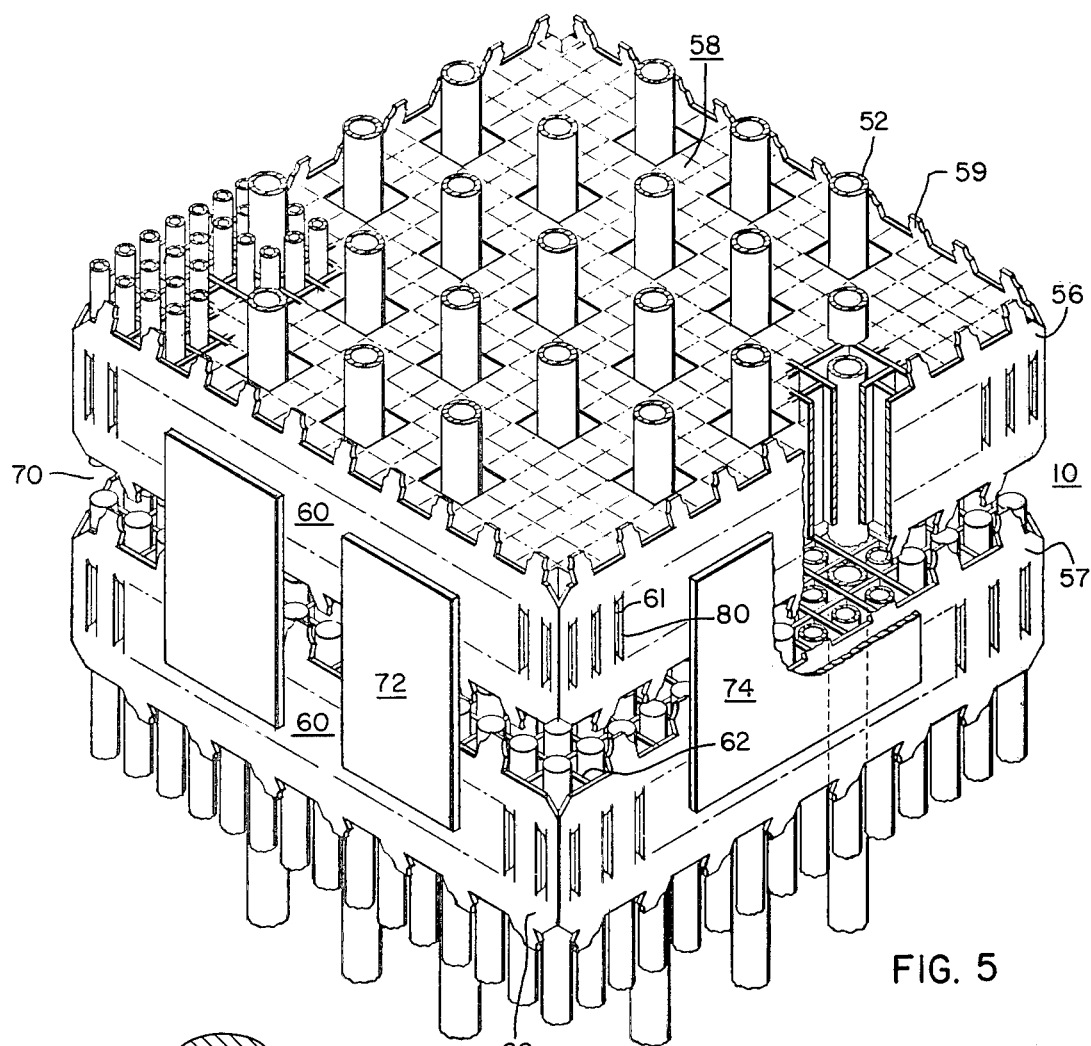
FIG. 5 is a perspective view, in elevation, of the central portion of a fuel assembly in accordance with an embodiment of the invention.
Figure 6:
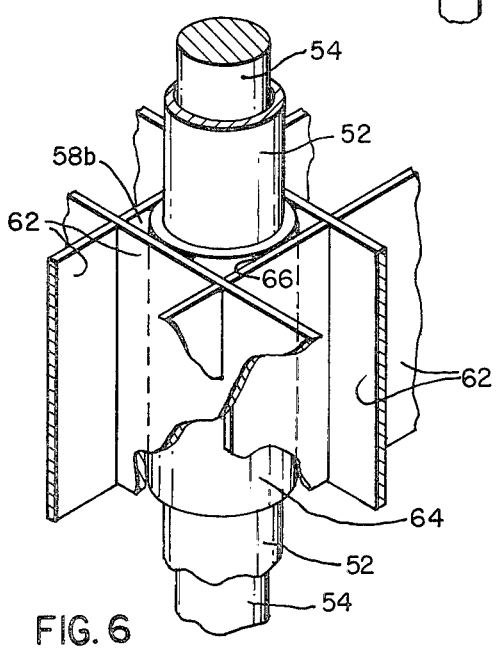
FIG. 6 is a perspective view of a cell of a fuel assembly in accordance with an embodiment of this invention.

It can also be seen from a comparison of FIGS. 3 and 4 that the cells 58b, which receive guide thimbles, are larger than the cells 58 of the lower grid 57. As the grids are affixed to the thimble 52 within a cell, a means for affixing the thimbles to both upper and lower grids must be provided. One means for such attachment is shown in FIG. 6. Here a sleeve 64 is provided and brazed 66, welded, or otherwise attached to the straps of the cell 58b of the upper grid 56 at, for example, four locations. The inner diameter of the sleeve 64 can be the same as the across flats dimension of a lower grid cell 58, 58a so as to maintain alignment of the thimble. In this case, the guide thimble can be brazed or otherwise directly attached to straps on the lower grid. Alternatively a large braze 66a, (FIG. 3) weld, or other attachment between the innerstrap 62 and the thimble outer periphery can be made thus eliminating use of the sleeve 64. The thimble can also be bulged or expanded above and below the sleeve 64 for the attachment. Or, the cell 58b can be formed with a strut 68 to which the thimble is attached. Further, the thimble 52 can have a cross section smaller than lower fuel rods 52 and accordingly the lower grid cells, and also smaller than the large cells 58b of the upper grid. In this configuration sleeves 64 can be incorporated separately in both the upper and lower grid cells wherein the sleeve have the same inside diameter for receiving the thimble but the separate sleeves will have differing outer diameters matched to the respective size of an upper grid cell 58b and a lower grid cell 58a.

Figure 7:
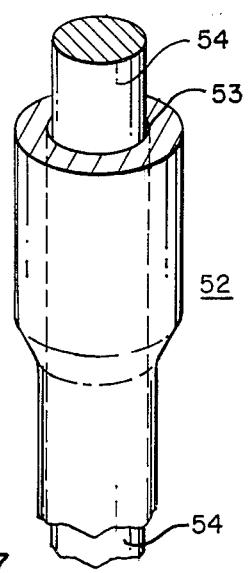
FIG. 7 is a perspective view of one type of fuel assembly thimble in accordance with this invention.

Further, as shown in FIG. 7, the thimble 52 can include a different diameter along its length so long as the inner aperture 53 is sufficiently large throughtout its length to allow passage of a control element rod 54. The aperture 53 can also have a varying size, for example, being larger at the upper portion and smaller at the lower portion, thereby additionally providing a dashpot effect for the control rod 54 at the lower portion of the thimble 52. The outer cross sections of the varying sized thimble can be sized to most compatibly fit within the grid cells, with or without sleeves.

It is preferable that a space 70 (FIGS. 2 and 5) be provided between the bottom of the upper fuel rods 40 and the top of the lower fuel rods 42. Space 70 can alleviate a pronounced change in power distribution which otherwise could occur at the interface of the lower and upper fuel rods, particularly where mixed oxide fuel is utilized. The space preferably is no larger than about two percent of the sum of the lengths of the upper and lower fuel rods. Too large of a space could allow an excessive area of moderating coolant in the center of the core, undesirably causing flux peaking. This effect, however, can be counteracted by fabricating the fuel rod sealing end caps in the interface area, or an attachment thereto, of a material and size to absorb excessive neutrons. It can also be counteracted by placing plenums 2, 4 in the fuel rods, which allow for a buildup of fission product gases, at the bottom of the lower fuel rods and at the top of the upper fuel rods. A support for the fuel pellets of the upper fuel rods, such as a spring 6 or other support means, can be utilized to maintain a lower fuel rod plenum. Similarly, depleted fuel in pellet or other form can be included at the bottom of the upper fuel rods and the top of the lower fuel rods or, inert ceramic spacers 8 can be positioned at these locations.

Across the space the lowermost upper grid 56 is preferably rigidly affixed to the uppermost lower grid 57 through their outer straps 60. This attachment can take many forms, including use of thin peripheral straps 72 or a larger peripheral strap 74, shown alternatively in FIG. 5. The straps 72, 74 are disposed externally of the rod array and can include structure as utilized in typical lattice grids, including flow mixing vanes 59, support springs 61, and flow openings 80. The lowermost upper grid is rigidly affixed to the uppermost lower grid in order to strengthen the assembly at its central region where relatively high stresses and deflections can occur in the event of a seismic occurrence.

The space 70 between the upper and lower fuel rod arrays is particularly useful where plutonium fuel is utilized in the lower rods and uranium in the upper rods to alleviate a power peak which occurs at the interface when the two fuels are used in other than a homogeneous mixture. The composite assembly 10 is further suited to utilization of mixed oxide fuel. The relative quantities of, for example, uranium and plutonium fuel can be adjusted by varying the length of the upper 40 and lower 42 fuel rods. It is preferable that plutonium bearing lower fuel rods be disposed over one half to two thirds of the fuel assembly and uranium bearing rods over the remaining one half to one third of the assembly. The inventive composite assembly is economically advantageous regarding plutonium utilization since plutonium fuel, for example in the form of plutonium oxide, is appreciably more expensive to fabricate than uranium as, for example, uranium dioxide, due to the high plutonium toxicity which requires remote fabrication. Placing the plutonium in larger diameter rods reduces the number of plutonium bearing rods per assembly, and accordingly the cost. Disposition of plutonium in the lower portion of the core is also beneficial in terms of nuclear control characteristics. By locating the plutonium near the bottom of the core where the worth of top-mounted control elements (as shown in FIG. 1) is lessened, the impact of the high neutron capture cross section of plutonium is reduced. Further, the effect of the strong moderator temperature coefficient of reactivity of plutonium on control requirements is reduced since the full load to no load coolant temperature swing is lessened in the plutonium zone where coolant enters the core 12. These advantages are discussed further in U.S. Pat. No. 4,096,933 in the name of R. F. Barry entitled "Core For A Nuclear Reactor".

It will also be noted that the disclosed assembly is beneficially responsive under assumed accident conditions where the core is temporarily drained of coolant. Upon such conditions a plurality of redundant systems operate to refill the reactor vessel from the bottom to the top. Accordingly, the more reactive lower rods are covered with coolant faster than the less reactive upper fuel rods, adding additional safety margin as compared to cores generating generally uniform power along their length.

There has therefore been described a composite fuel assembly useful in achieving higher reactor coolant temperatures and better overall reactor plant efficiency. The assembly is further beneficial for mixed oxide fuel utilization, as well as providing added flexibility in all types of core designs. It will be apparent that many modifications and additions are possible in view of the above teachings. It therefore is to be understood that within the scope of the appended claims the invention may be practiced other than as specifically described.

We claim:

1. A composite nuclear fuel assembly adapted for use with a thermal nuclear reactor having a liquid coolant flowing upwardly through a core including said assemblies in a vertical orientation, said assembly comprising:

a plurality of elongated coextending cylindrical upper nuclear fuel rods having fissionable nuclear fuel encased in a sealed cladding, said upper rods arranged in a closely spaced array;

a plurality of upper lattice structures disposed about said array of upper rods spaced at preselected elevations along said upper rods for laterally supporting said rods in individual cells, each said cell laterally enclosing a corresponding one of said upper rods;

a plurality of elongated cylindrical coextending lower nuclear fuel rods having fissionable nuclear fuel encased in a sealed cladding, said lower rods being arranged in a closely spaced array, the top of said lower rods being spaced a preselected distance below the bottom of said upper rods and each being of larger diameter than said upper fuel rods, the number of said lower rods in said assembly being smaller than the number of upper rods in said assembly; and a plurality of lower lattice structures disposed about said array of lower rods spaced at preselected elevations along said lower rods for laterally supporting said lower rods in individual cells, each said cell laterally enclosing a corresponding one of said upper rods the lateral periphery of said lower lattice structures being sized substantially similar to the lateral periphery of said upper lattice structures;

said upper and lower rods being the only fuel bearing rods in said assembly.

2. A composite nuclear fuel assembly adapted for use with a thermal nuclear reactor having a liquid coolant flowing upwardly through a core including said assemblies in a vertical orientation, said assembly comprising:

a plurality of elongated coextending cylindrical upper nuclear fuel rods having fissionable nuclear fuel encased in a sealed cladding, said fissionable fuel consisting essentially of uranium, said upper rods arranged in a closely spaced array;

a plurality of upper lattice structures disposed about said array of upper rods spaced at preselected elevations along said upper rods for laterally supporting said rods in individual cells, each said cell laterally enclosing a corresponding one of said upper rods;

a plurality of elongated coextending cylindrical lower nuclear fuel rods having fissionable nuclear fuel encased in a sealed cladding, said fissionable fuel consisting essentially of plutonium, said lower rods being arranged in a closely spaced array, the top of said lower rods being spaced a preselected distance below the bottom of said upper rods and each being of larger diameter than said upper fuel rods, said preselected distance being less than about two percent of the sum of the lengths of an upper rod and a lower rod, the number of said lower rods in said assembly being smaller than the number of upper rods in said assembly; and a plurality of lower lattice structures disposed about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures;

said upper and lower rods being the only fuel bearing rods in said assembly.

3. A composite nuclear fuel assembly adapted for use with a thermal nuclear reactor having a liquid coolant flowing upwardly through a core including said assemblies in a vertical orientation, said assembly comprising:

a plurality of elongated coextending cylindrical upper nuclear fuel rods having fissionable nuclear fuel encased in a sealed cladding, said upper rods arranged in a closely spaced array, each said upper rod having an inert ceramic spacer disposed within said cladding at the bottom of each said upper rod;

a plurality of upper lattice structures disposed about said array of upper rods spaced at preselected elevations along said upper rods for laterally supporting said rods in individual cells, each said cell laterally enclosing a corresponding one of said upper rods;

a plurality of elongated coextending cylindrical lower nuclear fuel rods having fissionable nuclear fuel encased in a sealed cladding, said lower rods being arranged in a closely spaced array, the top of said lower rods being spaced a preselected distance below the bottom of said upper rods and each being of larger diameter than said upper fuel rods, the number of said lower rods in said assembly being smaller than the number of upper rods in said assembly, each said lower rod having an inert ceramic spacer disposed within said cladding at the top of each said lower rod;

a plurality of lower lattice structures disposed about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures;

said upper and lower rods being the only fuel bearing rods in said assembly.

4. A core for a thermal nuclear reactor having a liquid coolant flowing upwardly through a plurality of fuel assemblies in a vertical orientation, at least one of said assemblies comprising:

a plurality of elongated coextending cylindrical upper nuclear fuel rods having fissionable nuclear fuel encased in a sealed cladding, said rods arranged in a rectangular array and each having a plenum at its upper portion for containing fission gases;

a plurality of rectangular upper lattice structures disposed about said array of upper rods spaced at preselected elevations along said upper rods for laterally supporting said rods in individual cells, each said cell laterally enclosing a corresponding one of said upper rods;

a plurality of elongated coextending cylindrical lower nuclear fuel rods having fissionable nuclear fuel encased in a sealed cladding, each said lower rod having a plenum at its lower portion for containing fission gases, said rods being arranged in a rectangular array, the top of said lower rods being spaced a preselected distance below the bottom of said upper rods and each being of larger diameter than said upper rods, the number of said lower rods in said assembly being smaller than the number of upper rods in said assembly; and a plurality of rectangular lower lattice structures disposed about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures.

5. A composite nuclear fuel assembly adapted for use with a thermal nuclear reactor having a liquid coolant flowing upwardly through a core including said assemblies in a vertical orientation, said assembly comprising:

a plurality of elongated coextending cylindrical upper nuclear fuel rods having fissionable nuclear fuel encased in a sealed cladding; said upper rods arranged in a closely spaced array;

a plurality of upper lattice structures disposed about said array of upper rods spaced at preselected elevations along said upper rods for laterally supporting said rods in individual cells, each said cell laterally enclosing a corresponding one of said upper rods;

a plurality of elongated coextending cylindrical lower nuclear fuel rods having fissionable nuclear fuel encased in a sealed cladding, said lower rods being arranged in a closely spaced array, the top of said lower rods being spaced a preselected distance below the bottom of said upper rods and each being of larger diameter than said upper fuel rods, the number of said lower rods in said assembly being smaller than the number of upper rods in said assembly; and a plurality of lower lattice structures disposed about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures;

said upper and lower rods being the only fuel bearing rods in said assembly;

said upper and lower lattice structures being affixed to a vertical guide thimble disposed among said upper and lower rod arrays by aligned tubular sleeves affixed within said lattice structures, said sleeves affixed to said upper lattice structures having a larger outside diameter than said sleeves affixed to said lower lattice structures, and said upper and lower sleeves having the same inside diameter, said thimble passing through and being affixed to said sleeves.

6. A composite nuclear fuel assembly adapted for use with a thermal nuclear reactor having a liquid coolant flowing upwardly through a core including said assemblies in a vertical orientation, said assembly comprising:

a plurality of elongated coextending cylindrical upper nuclear fuel rods having fissionable nuclear fuel encased in a sealed cladding, said upper rods arranged in a closely spaced array;

a plurality of upper lattice structures disposed about said array of upper rods spaced at preselected elevations along said upper rods for laterally supporting said rods in individual cells, each said cell laterally enclosing a corresponding one of said upper rods;

a plurality of elongated coextending cylindrical lower nuclear fuel rods having fissionable nuclear fuel encased in a sealed cladding, said lower rods being arranged in a closely spaced array, the top of said lower rods being spaced a preselected distance below the bottom of said upper rods and each being of larger diameter than said upper fuel rods, the number of said lower rods in said assembly being smaller than the number of upper rods in said assembly; and a plurality of lower lattice structures disposed about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures;

said upper and lower rods being the only fuel bearing rods in said assembly;

said upper and lower lattice structures being affixed to a vertical tubular guide thimble disposed among said upper and lower rod arrays, said thimble having a larger outer diameter among said upper fuel than among said lower fuel rods.

7. A composite nuclear fuel assembly adapted for use with a thermal nuclear reactor having a liquid coolant flowing upwardly through a core including a plurality of said assemblies in a vertical orientation, each said assembly comprising:

a plurality of elongated coextending cylindrical upper nuclear fuel rods having fissinable uranium fuel encased in a sealed cladding, said rods arranged in a rectangular array and each having a plenum at its upper portion for containing fission gases;

a plurality of rectangular upper lattice structures about said array of upper rods spaced at preselcted elevations along said upper rods for laterally supporting said rods in individual cells, each said cell laterally enclosing a corresponding one of said upper rods;

a plurality of elongated coextending cylindrical lower nuclear fuel rods having fissionable plutonium fuel encased in a sealed cladding, said rods being arranged in a rectangular array, the top of said lower rods being spaced below the bottom of said upper rods a distance less than about two percent of the sum of the lengths of an upper and lower fuel rod, each said lower rod being of larger diameter than said upper fuel rods, the number of said lower rods in said assembly being smaller than the number of upper rods in said assembly, each said lower fuel rod having a plenum at its lower portion;

a plurality of rectangular lower lattice structures about said array of lower rods spaced at preselected elevations along said lower rods for laterally supporting said lower rods in individual cells, each said cell laterally enclosing a corresponding one of said lower rods, the lateral periphery of said lower lattice structures being sized substantially similar to the lateral periphery of said upper lattice structures; and a plurality of tubular thimbles affixed to each said upper and lower lattice structures by concentric tubular sleeves, the sleeves associated with said upper lattice structures being aligned with and having a larger outer diameter than the sleeves associated with said lower lattice structures.

* * * * *